(12) United States Patent
Ramaraju et al.

(10) Patent No.: US 8,099,580 B2
(45) Date of Patent: Jan. 17, 2012

(54) TRANSLATION LOOK-ASIDE BUFFER WITH A TAG MEMORY AND METHOD THEREFOR

(75) Inventors: Ravindraraj Ramaraju, Round Rock, TX (US); Jogendra C. Sarker, Austin, TX (US); Vu N. Tran, Austin, TX (US)

(73) Assignee: Freescale Semiconductor, Inc, Austin, TX (US)

( * ) Notice: Subject to any disclaimer, the term of this patent is extended or adjusted under 35 U.S.C. 154(b) by 407 days.

(21) Appl. No.: 12/480,809

(22) Filed: Jun. 9, 2009

(65) Prior Publication Data

US 2010/0312957 A1   Dec. 9, 2010

(51) Int. Cl.
*G06F 12/00* (2006.01)

(52) U.S. Cl. ........................................................ 711/206

(58) Field of Classification Search .................. None
See application file for complete search history.

(56) References Cited

U.S. PATENT DOCUMENTS

| | | | | |
|---|---|---|---|---|
| 6,014,732 | A * | 1/2000 | Naffziger | 711/203 |
| 6,286,091 | B1 * | 9/2001 | Park | 711/207 |
| 6,625,714 | B1 * | 9/2003 | Lyon | 711/207 |
| 6,876,559 | B1 * | 4/2005 | Rathnavelu et al. | 365/49.1 |
| 6,934,796 | B1 * | 8/2005 | Pereira et al. | 711/108 |
| 6,957,315 | B2 | 10/2005 | Chauvel | |
| 2007/0028051 | A1 | 2/2007 | Williamson et al. | |
| 2007/0033318 | A1 | 2/2007 | Gilday et al. | |
| 2010/0246251 | A1 * | 9/2010 | Chen et al. | 365/171 |

OTHER PUBLICATIONS

Juan et al; "Reducing TLB Power Requirements"; 1997 International Symposium on Low Power Electronics and Design, Aug. 1997, pp. 196-201.

Chang et al; "Hybrid-Type CAM Design for Both Power and Performance Efficiency"; IEEE Transactions on Very Large Scale Integration (VLSI) Systems, vol. 16, Issue 8, Aug. 2008 pp. 965-974.

* cited by examiner

*Primary Examiner* — Hiep Nguyen
(74) *Attorney, Agent, or Firm* — James L. Clingan, Jr.

(57) ABSTRACT

A translation look-aside buffer (TLB) has a TAG memory for determining if a desired translated address is stored in the TLB. A TAG portion is compared to contents of the TAG memory without requiring a read of the TAG memory because the TAG memory has a storage portion that is constructed as a CAM. For each row of the CAM a match determination is made that indicates if the TAG portion is the same as contents of the particular row. A decoder decodes an index portion and provides an output for each row. On a per row basis the output of the decoder is logically combined with the hit/miss signals to determine if there is a hit for the TAG memory. If there is a hit for the TAG memory, a translated address corresponding to the index portion of the address is then output as the selected translated address.

20 Claims, 4 Drawing Sheets

TRANSLATION LOOK-ASIDE BUFFER WITH A TAG MEMORY AND METHOD THEREFOR

BACKGROUND

1. Field

This disclosure relates generally to translation look-aside buffers and, more specifically, to translation look-aside buffers having a TAG memory.

2. Related Art

Memory usage is a significant part of system performance. Using a cache or even multiple caches at different levels can significantly enhance performance. Use of a cache includes determining if the desired information is present in the cache. The information has an address so that the determination of the presence or absence of the desired information is based on the address. Typically a TAG memory is used for this determination. Typically the TAG memory stores addresses of stored information and compares a TAG portion of the address to the stored addresses to determine if the stored information is present in the cache. A determination that the stored information is present is typically called a hit. The process of performing the comparison is generally time consuming because the memory storing the TAG portions of the addresses must be accessed and then compared. This can also require substantial chip area.

Thus there is a need for a TAG circuit that improves on one or more of issues described above.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

DETAILED DESCRIPTION

In one aspect, a translation look-aside buffer (TLB) having a TAG memory for determining if a desired translated address is stored in a data storage portion of the TLB. A TAG portion of the address is compared to contents of the TAG memory without requiring a read of the TAG memory because the TAG memory has a storage portion that is constructed as a CAM. For each row of the CAM a match determination is made that indicates if the TAG portion is the same as contents of the particular row. A decoder decodes an index portion of the address and provides an output for each row. On a per row basis the output of the decoder is logically combined with the hit/miss signals to determine if there is a hit for the TAG memory. If there is a hit for the TAG memory, a translated address corresponding to the index portion of the address is then output as the selected translated address. This is better understood by reference to the following description and the drawings.

Figure 1:
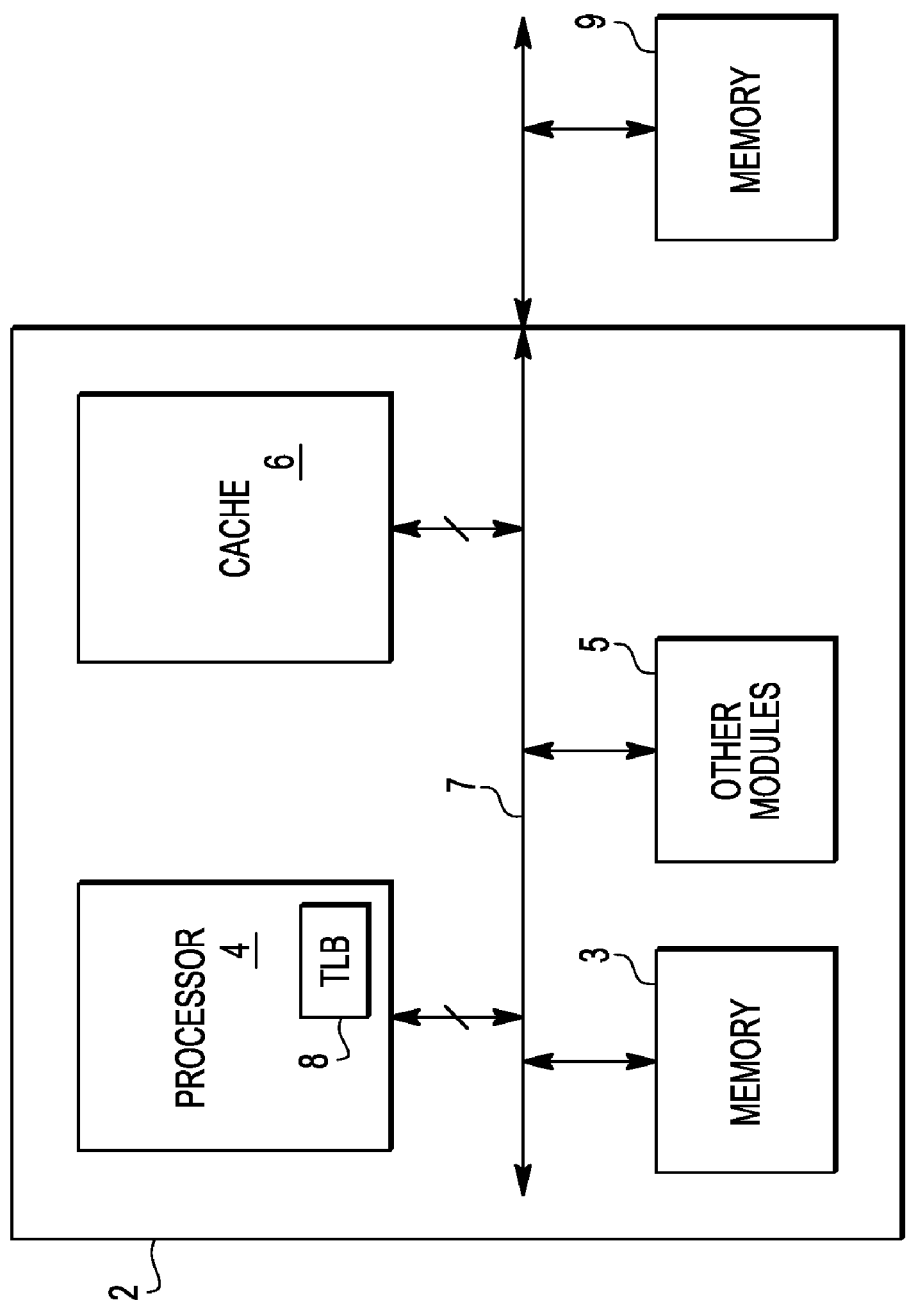
FIG. 1 is a block diagram of a system having cache memories according to an embodiment.

Shown in FIG. 1 is an integrated circuit 2 and a memory 9 coupled to integrated circuit 2. Integrated circuit 2, which may be a system itself, comprises a processor 4 coupled to a bus 7, a memory 3 coupled to bus 7, a cache 6 coupled to bus 7, and other modules 5. Included in processor 4 is a translation look-aside buffer (TLB) 8. Cache 6 is smaller than memory 3, but cache 6 provides faster access than memory 3.

Figure 2:
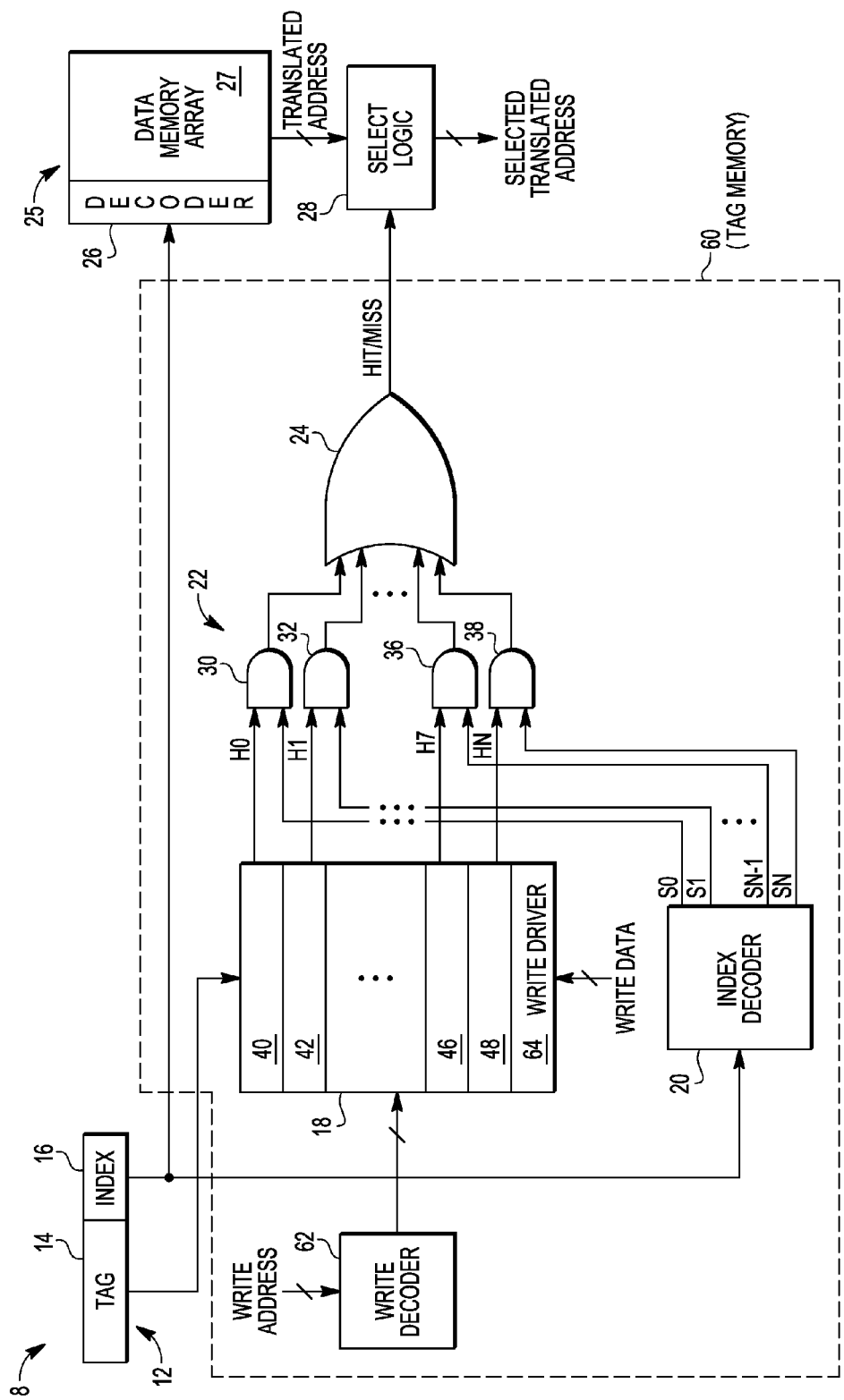
FIG. 2 is a block diagram of a TAG circuit according to the embodiment.

Shown in FIG. 2 is TLB 8 of FIG. 1 shown in more detail. TLB 8 comprises a CAM 18, an index decoder 20, hit logic 22, an OR circuit 24, a data memory 25, select logic 28, and a write decoder 62. Write decoder 62, index decoder 20, CAM 18, and hit logic 22 comprise a TAG memory 60. Data memory 25 comprises a data memory array 27 and a decoder 26. Hit logic 22 comprises AND circuits 30, 32, 36, and 38 as well as other AND circuits not shown. CAM 18 comprises rows 40, 42, 46, and 48, other rows not shown, and a write driver 64 that receives write data. Also shown in FIG. 2 is an address 12 being received by TLB 8 that has a TAG 14 received by CAM 18 and an index 16 received by index decoder 20 and decoder 26 of data memory 25. Write decoder 62 is coupled to CAM 18. Row 40 provides a signal H0 to a first input of AND circuit 30. Row 42 provides a signal H1 to a first input of AND circuit 32. Row 46 provides a signal H(N−1) to a first input of AND circuit 36. Row 48 provides a signal HN to a first input of AND circuit 38. Index decoder 20 provides select signals S0, S1, S(N−1), and SN to second inputs of AND circuits 30, 32, 36, and 38, respectively. Outputs of AND circuits 30, 32, 36, and 38 are coupled to the first, second, third, and fourth inputs of OR circuit 24. OR circuit 24 has additional inputs not shown connected to AND circuits of hit logic 22 that are not shown. An output of OR circuit 24 is coupled to a first input of select logic 28. Select logic 28 has a second input coupled to an output of data memory 25 and an output for providing a selected translated address. CAM 18 has rows with contents that can also be called entries.

Address 12 is for identifying a location of a translated address and TLB 8 determines if that translated address is present in data memory 25, and if it is present, providing it as the selected translated address. CAM 18 receives TAG 14 and determines if TAG 14 matches any of the contents of CAM 18. If there is a match on any of the rows, such as rows 40, 42, 46, and 48, of CAM 18, the rows with matching contents assert a hit signal, such as H0, H1, H(N−1), and HN. Index decoder 20 identifies the particular row of the index by asserting a select signal, such as select signal S0, S1, S(N−1), or SN, to the corresponding AND circuit such as 30, 32, 36, or 38, respectively. If row 40 has the address of TAG 14 and row 40 is selected by index 16, then signal H0 is asserted and select signal S0 is asserted. AND circuit 30 will then respond by asserting its output to OR circuit 24 which will then generate hit/miss signal as a hit. While this is occurring, data memory 25 is responding to index 16 by providing the translated address to select logic 28. When OR circuit 24 provide the hit/miss signal as a hit, the translated data is already present at select logic 28. Select logic 28, upon receiving the hit/miss signal as a hit, outputs the translated address from memory 25 as the selected translated address.

If a row has the TAG but it is not the row of the index, the corresponding AND circuit then receives an asserted hit signal but a deasserted select signal. Thus the output of the corresponding AND circuit is deasserted. For example, if row 40 has the TAG, H0 is asserted. If row 42 is the row of the index, then select signal S0 is deasserted. Thus, AND circuit 30 receives one asserted input and one deasserted input. This results in a deasserted output. All of the select signals except select signal S1 are deasserted. Thus only if row 42 matches TAG 14 can there be an asserted output from hit logic 22. If row 42 does not match TAG 14, then AND circuit 32 has one deasserted input and one asserted input resulting in providing a deasserted output to OR circuit 24. With all of the inputs of OR circuit 24 being deasserted, OR gate 24 provides the hit/miss signal as a miss and select logic 28 blocks the translated address from data memory 25.

A CAM may be considered to simply provide a compare by row such as CAM 18. A CAM, however, may be considered the circuit that performs a compare in the manner of CAM 18 and also includes the logic that determines a hit or miss. Thus, logic 22 and OR gate 24 together with index decoder 20 and CAM 18 may also be considered a CAM.

Figure 3:
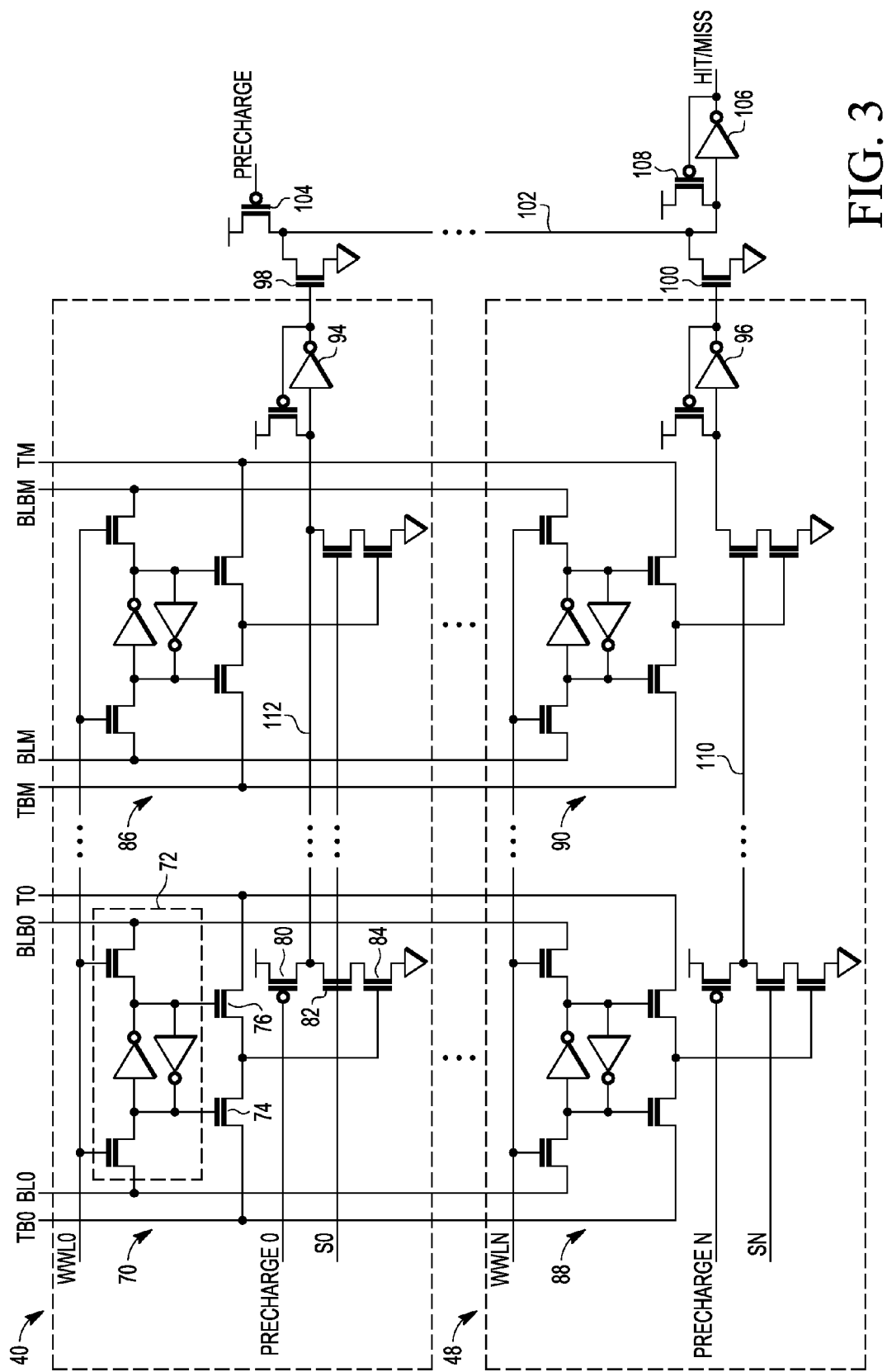
FIG. 3 is a circuit diagram showing a first alternative for a portion of the TAG.

Shown in FIG. 3 is an implementation of CAM 18 and hit logic 22 showing row 40 and row 48 of CAM 18 integrated with portions of hit logic 22. Row 40 comprises memory cell 70 and memory cell 86. Memory cell 70 includes a cross-coupled pair of inverters, a pair of pass transistors coupled to bit line pair BL0 and BLB0 and word line WL0, a transistor 74, and a transistor 76. Transistors 74 and 76 are both N channel transistors. The cross-coupled inverters and pass transistors are coupled in conventional fashion. Transistor 74 has a gate coupled to a true storage node of memory cell 70, a first current electrode coupled to a TAG line TB0, and a second current electrode. Transistor 76 has a gate connected to a complementary storage node of memory cell 70, a first current electrode coupled to a complementary TAG line T0, and a second current electrode coupled to the second current electrode of transistor 76. Hit logic analogous to hit logic 22 of FIG. 2 includes transistors 82 and 84 for memory cell 70, similar transistors for each other memory cell of row 40, and inverter 94, transistor 98, and transistor 80 for row 40. For each row, logic 22 includes similar transistors and inverters to those for row 40. Transistor 80 is a P channel transistor and transistors 82 and 84 are N channel transistors. Transistor 80 has a source connected to a power supply terminal, a gate for receiving a precharge signal, and a drain. Transistor 82 has a drain connected to the drain of transistor 80, a gate for receiving select signal S0, and a source. Transistor 82 has a drain connected to the source of transistor 80, a gate coupled to the second current electrodes of transistors 74 and 76, and a source connected to ground. Transistors 82 and 84 form a logic pair that form a NAND function. Each cell has a corresponding logic pair in the manner that transistors 82 and 84 correspond to cell 70. Each cell is also coupled to a pair of bit lines and TAG lines in the manner of cell 70 is coupled to bit line pair BL0 and BLB0, word line WL0, and TAG line pair T0 and TB0. Memory cells 86 and 90, for example, are coupled to bit line pair BL and BLM, word line WWLN, and TAG line pair TM and TBM.

The contents of cell 70 are compared to the first bit of TAG 14, which is T0, in conventional CAM fashion. If a logic high is stored and T0 is also a logic high, there is a match which is indicated by transistor 74 being conductive and coupling the logic low of TB0 to the gate of transistor 84. Transistor 84 is thus non-conductive when there is a logic high match. If there is a logic low stored and T0 is also a logic low there is a match which is indicated by transistor 76 being conductive and the logic low of T0 being coupled to the gate of transistor 84 causing transistor 84 to be non-conductive. For a mismatch in which there is a stored logic high and a logic low for T0, transistor 74 is conductive and couples a logic high to the gate of transistor 84 causing it to be conductive. Similarly for a stored logic low and a logic high for T0, transistor 76 is conductive and couples the logic high of T0 to the gate of transistor 84 causing transistor 84 to be conductive. If index 16 selects row 40, select signal S0 is a logic high which causes transistor 80 to be conductive. This causes the drain of transistor 82 to be a logic low if there is a mismatch with T0. Thus a miss for cell 70, which is a mismatch with its corresponding bit location in TAG 14 and is in the row selected by index 16, is indicated by a logic low on its corresponding logic pair which are transistors 80 and 82. A hit for cell 70 is indicated by transistor 84 being non-conductive so that even with transistor 82 being conductive, the logic pair of transistors 82 and 84 provide a logic high output. Cell 86 similarly performs a compare to TAG bit TM, which is the last bit of TAG 14. If it is a match, a logic high is provided on the output of the corresponding logic pair even if row 40 is selected by index 16. The precharge signal ensures that the drain of transistor 82 is precharged to the logic high condition. Thus the output of the logic pair is precharged to a logic high which is the case for all of the logic pairs.

All of the outputs of the logic pairs of a row are connected together. In the case of row all of the logic pairs including the logic pair of transistors 82 and 84 have their outputs connected together and coupled to the input of inverter 94. The output of inverter 94 is coupled to the gate of transistor 98. Transistor 98 as the output transistor for row 40, with its source connected to VSS and its drain connected to line 102, will cause a logic low on line 102 if any of the cells of row 40 are a mismatch for the case where row 40 is selected. For deselected rows, the select signal is a logic low which causes the transistors of the logic pair that receives the select signal is non-conductive. The result is that each logic pair of the deselected row provides a logic high output at line 110 of row 48 and similar lines on the other rows. The further result is that the output transistors, which have drains coupled to line 102, of the deselected rows will be non-conductive. Thus, in the case of row 40 being selected, a logic low on line 102 occurs only when the output transistor of the selected row is conductive. In the case of row 40 being selected, transistor 98 is conductive if the output of inverter 94 is a logic high. The output of inverter 94 is a logic high if its input is a logic low. The input to inverter 94 is a logic low when there is a mismatch on at least one of the cells of row 40. Thus a logic low on line 102 indicates a miss. Inverter 106 has an input connected to the line 102 that outputs a logic high as the miss/hit signal when there is a miss. Line 102 is precharged through transistor 104 to a logic high. Thus, the miss/hit signal is provided as a logic low and latched by transistor 102 until it is provided as a logic low in response to a determination there has been a miss.

When the selected row has a match on all of its cells, the logic pairs are all providing logic high outputs. Thus in the case of row 40, the input to inverter 94 is a logic high which causes the output of inverter 94 to be a logic low which causes transistor 98, as the output transistor of row 40, to be non-conductive. With all of the non-selected rows having their corresponding output transistors being non-conductive, line 102 is a logic high which is the same as the precharge condition. The logic high on line 102 thus keeps inverter 106 providing a logic low output, which is indicates a hit.

Figure 4:
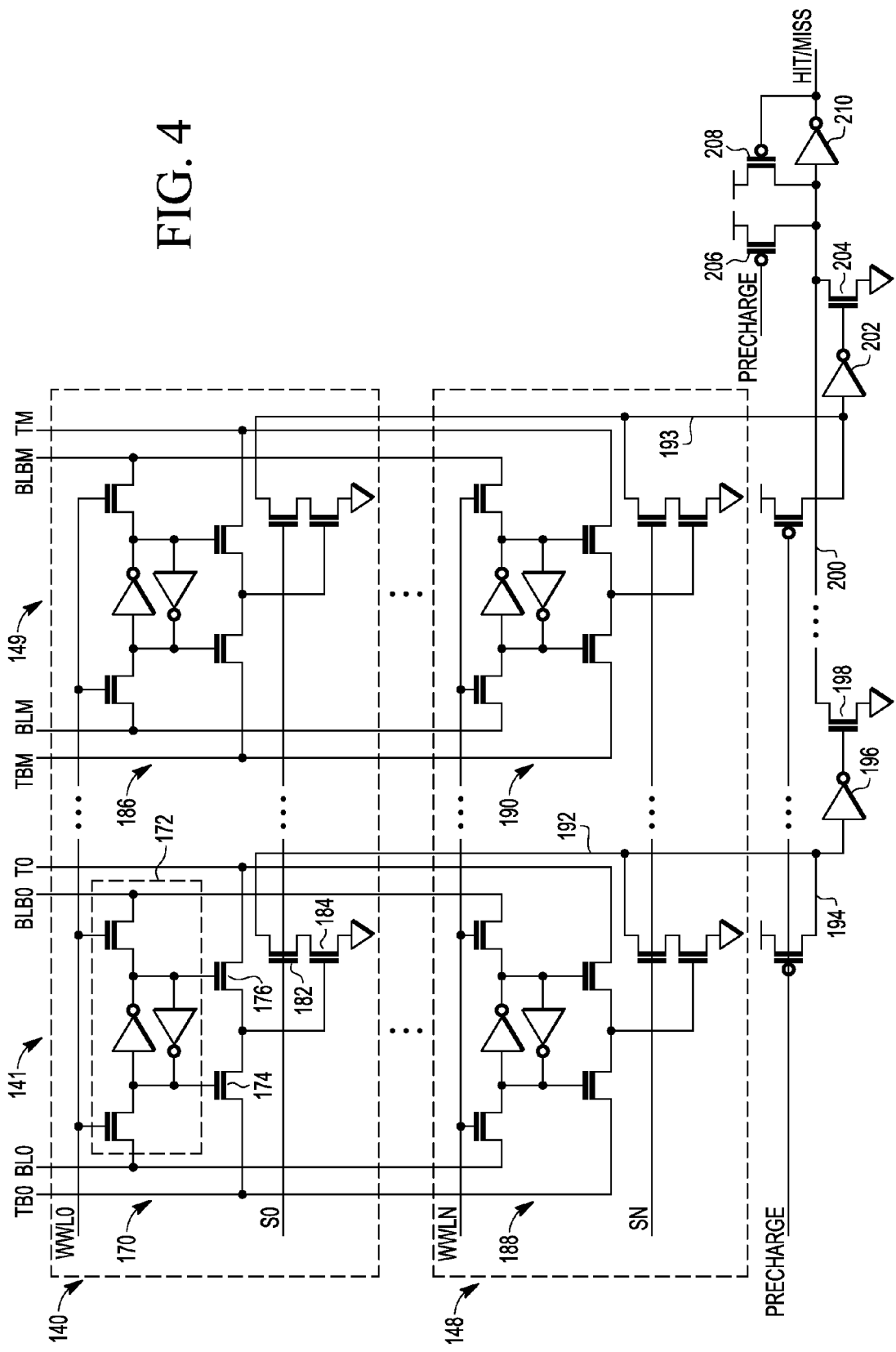
FIG. 4 is a circuit diagram a second alternative for the portion of the TAG.

Shown in FIG. 4 is another implementation of CAM 18 and hit logic 22 showing row 140 and row 148 of CAM 18 integrated with portions of hit logic 22 in an alternate form from that shown in FIG. 3. In the form shown in FIG. 3, the logic was first formed on a per row basis. In the implementation shown in FIG. 4, the logic is first performed on a per column basis. A row 140 comprises a memory cell 170 and a memory cell 186. A row 148 comprises a memory cell 188 and a memory cell 190. A column 141 comprises memory cell 170 and memory cell 188, and a column 149 comprises memory cell 186 and memory cell 190. Memory cell 170 includes a cross-coupled pair of inverters, a pair of pass transistors coupled to bit line pair BL0 and BLB0 and word line WWL0, a transistor 174, and a transistor 176 in which transistors 174 and 176 are both N channel transistors. The cross-coupled inverters and pass transistors are coupled in conventional fashion. Transistor 174 has a gate coupled to a true storage node of memory cell 170, a first current electrode coupled to a complementary TAG line TB0, and a second current electrode. Transistor 176 has a gate connected to a complementary storage node of memory cell 170, a first current electrode coupled to a true TAG line T0, and a second current electrode coupled to the second current electrode of transistor 76. Hit logic analogous to hit logic 22 of FIG. 2 includes transistors 182 and 184 for memory cell 170, similar transistors for each other memory cell of column 141, and transistor 194 for precharge, inverter 196, and transistor 198 for column 141. For each column, logic similar to logic 22 of FIG. 2 includes similar transistors and inverters to those for column 141. Transistor 194 is a P channel transistor and transistors 182 and 184 are N channel transistors. Transistor 194 has a source connected to a power supply terminal, a gate for receiving a precharge signal, and a drain connected to a line 192. Transistor 182 has a drain connected to line 192, a gate for receiving select signal S0, and a source. Transistor 184 has a drain connected to the source of transistor 182, a gate coupled to the second current electrodes of transistors 74 and 76, and a source connected to ground. Transistors 182 and 184 form a logic pair that form a NAND function coupled to line 192. Each cell has a corresponding logic pair in the manner that transistors 82 and 84 correspond to cell 170. The logic pairs in column 141 are coupled to line 192. Logic pairs in column 149 are coupled to a line 193 analogous to line 192. Inverter 196 has an input coupled to line 192 and an output. Transistor 198 has a gate coupled to the output of inverter 196, a source connected to VSS, and a drain connected to a line 200. Associated with Column 149, the hit logic further includes inverter 202 and N channel transistor 204. Inverter 202 has an input coupled to line 193 and an output. Transistor 204 has a gate coupled to the output of inverter 202, a source connected to VSS, and a drain connected to a line 200. Each column has circuitry analogous to the operation of inverters 196 and 202 and transistors 198 and 204 and are connected to line 200. The hit logic analogous to hit logic 22 of FIG. 2 further includes precharge transistor 206 coupled to line 200, an inverter 210, and a P channel transistor 208 as the output logic to indicate a hit or miss. Inverter 210 has an input coupled to line 200 and an output for providing the hit/miss signal. Transistor 208 has a gate coupled to the output of inverter 210, a source connected to VDD, and a drain coupled to the input of inverter 210. As for the TAG shown in FIG. 3, each cell is also coupled to a pair of bit lines and TAG lines in the manner that cell 170 is coupled to bit line pair BL0 and BLB0, word line WWL0, and TAG line pair T0 and TB0. Memory cells 186 and 190, for example, are coupled to bit line pair BL and BLM, word line WWLN, and TAG line pair TM and TBM.

The operation is very similar to that for the implementation shown in FIG. 3. A hit is based on the contents of the selected row being a match with the TAG. For the example of row 140 being the selected row, transistor 182 is conductive because signal S0 is a logic high. If memory cell 170 is a match transistor 184 is non-conductive because the TAG line with the logic low is coupled to the gate of transistor 184. Thus, the logic pair of memory cell 170 provides a logic high to line 192. The other memory cells of column 141 are on a deselected row so the transistor of the logic pair connected to the select line is non-conductive ensuring a logic high is provided to line 192. Thus a logic high on line 192 indicates a match for column 141. Similarly for column 149, a match for memory cell 186 results in line 193 being at a logic high. A logic high on line 192 results in inverter 196 providing a logic low output to the gate of transistor 198. Thus transistor 198 is non-conductive and the logic high precharged on line 200 remains. Similarly for line 193 being at a logic high, inverter 202 provides a logic low output to the gate of transistor 204 so that transistor 204 is held non-conductive. Transistor 204, being non-conductive, allows the logic precharged on line 200 to remain. If there is then a match on row 140 when row 140 is selected, a logic high is retained on line 200 and inverter 210 provides a logic low output to indicate a hit.

On the other hand, a selected row may have one or more memory cells that are not a match with the TAG. In the case of row 140 being the selected row and there not being a match for memory cell 170, the logic high of the TAG will be coupled to the gate of transistor 184 which will cause transistor 184 to be conductive. Transistor 182 is conductive because select signal S0 is a logic high because row 140 is selected. Thus the logic pair of memory cell 170 is conductive causing a conductive path to ground on line 192, resulting in a logic low on line 192. Inverter provides a logic high to the gate of transistor 198 which causes transistor 198 to be conductive and line 200 to be at a logic low. The logic low on line 200 causes inverter 210 to provide a logic high output which indicates a miss. The hit logic associated with each memory cell will respond in the same way to a non-match causing line 200 to be a logic low.

Thus, the implementations shown in FIGS. 3 and 4 show more detailed approaches of how to implement the principles of hit logic 22 of FIG. 2 to achieve the hit/miss information. The logic in principle is shown in FIG. 2, but detailed implementations are shown in FIGS. 3 and 4. The individual logic AND gates of FIG. 2 can be implemented combined with the CAM matching using a logic pair of transistors and other logic gates.

Although the invention is described herein with reference to specific embodiments, various modifications and changes can be made without departing from the scope of the present invention as set forth in the claims below. For example, a single line was drawn serially through the cores from the group controller, this may be achieved with multiple lines or different lines from the group controller. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

The term "coupled," as used herein, is not intended to be limited to a direct coupling or a mechanical coupling.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

Additional Text

1. A method, comprising:
   providing a content addressable memory (CAM) for example: (18) having a plurality of CAM rows for example: (40, 42, 44, 46, 48), the plurality of CAM rows storing a plurality of CAM entries, wherein each CAM row of the plurality of CAM rows stores a corresponding one of the plurality of CAM entries;

providing a data memory (DM) for example: (25) having a plurality of DM rows, the plurality of DM rows storing a plurality of DM entries, wherein each DM row of the plurality of DM rows stores a corresponding one of the plurality of DM entries;

providing an address for example: (12), the address comprising a tag portion for example: (14) and an index portion for example: (16);

decoding for example: (20, 26) the index portion of the address to produce a decoded index for example: (S0-SN);

providing the decoded index to the CAM;

providing the decoded index to the DM;

in response to providing the decoded index to the CAM, selecting only one of the plurality of CAM rows as a selected CAM row;

in response to providing the decoded index to the DM, selecting only one of the plurality of DM rows as a selected DM row;

concurrently comparing the tag portion of the address to all of the plurality of CAM entries;

in response to said step of concurrently comparing the tag portion of the address to all of the plurality of CAM entries, producing a corresponding match/non-match signal for example: (H0-HN) for each of the plurality of CAM entries; and asserting a hit/miss signal for example: (output of 24) to indicate a hit only when a first one of the plurality of CAM rows is selected and the corresponding match/non-match signal for said first one of the plurality of CAM rows indicates a match.

2. A method as in statement 1, or any other appropriate statement herein, wherein the step of concurrently comparing the tag portion of the address to all of the plurality of CAM entries is completed before said step of decoding the index portion of the address is begun.

3. A method as in statement 1, or any other appropriate statement herein, wherein said CAM comprises a plurality of ways, and wherein the hit/miss signal corresponds to a first way of the plurality of ways and a second hit/miss signal corresponds to a second way of the plurality of ways.

4. A method as in statement 1, or any other appropriate statement herein, wherein said CAM comprises a plurality of ways, and wherein the hit/miss signal for only one way of the plurality of ways is ever asserted at a same time.

5. A method as in statement 1, or any other appropriate statement herein, wherein said DM comprises a plurality of ways, the method further comprising:
using the hit/miss signal for example: (output of 24) to select one of the plurality of ways of the DM for example: (28).

6. A method as in statement 1, or any other appropriate statement herein, wherein said CAM comprises a translation look-aside buffer.

7. A method as in statement 1, or any other appropriate statement herein, wherein the method is performed during a cache access for a read operation.

8. A cache for example: (10), comprising:
one or more first conductors for transferring a tag portion for example: (14) of an address for example: (12);
one or more second conductors for transferring an index portion for example: (16) of the address for example: (12);

a translation look-aside buffer for example: (18, 30, 32, 36, 38, 24) coupled to the one or more first conductors for receiving the tag portion, wherein the translation look-aside buffer comprises a content addressable memory (CAM), wherein the CAM for example: (18) comprises a plurality of CAM rows for example: (40, 42, 44, 46, 48), wherein the plurality of CAM rows store a plurality of CAM entries, wherein each CAM row of the plurality of CAM rows stores a corresponding one of the plurality of CAM entries;

a data memory (DM), wherein the DM for example: (25) comprises a plurality of DM rows, the plurality of DM rows storing a plurality of DM entries, wherein each DM row of the plurality of DM rows stores a corresponding one of the plurality of DM entries; and decode circuitry for example: (20, 26, 62), coupled to the one or more second conductors for receiving the index portion, wherein said decode circuitry decodes the index portion to produce a decoded index for example: (S0-SN), and wherein the decode circuitry is coupled to both the CAM and the DM to provide the decoded index.

9. A cache as in statement 8, or any other appropriate statement herein, wherein the decoded index is used to select both a first one of the plurality of CAM rows and a first one of the plurality of DM rows for example: (FIG. 2 and FIG. 3).

10. A cache as in statement 8, or any other appropriate statement herein, wherein the decode circuitry comprises:
a first read decoder for example: (20) coupled to the CAM; and
a second read decoder for example: (26) coupled to the DM,
wherein both the first read decoder and the second read decoder receives the index portion for example: (16) of the address for example: (12) and provide the decoded index for example: (S0-SN) during a read access to the cache.

11. A cache as in statement 10, or any other appropriate statement herein, wherein the decode circuitry further comprises:
a first write decoder for example: (62) coupled to the CAM;
wherein both the first write decoder receives the index portion for example: (16) of the address for example: (12) and provides the decoded index for example: (S0-SN) during a write access to the cache.

12. A cache as in statement 8, or any other appropriate statement herein, wherein the translation look-aside buffer comprises:
a plurality of match/non-match signals for example: (H0-HN), wherein each one of the plurality of match/non-match signals corresponds to a corresponding one of the plurality of CAM rows, wherein each one of the plurality of match/non-match signals is asserted in response to the tag portion of the address matching the corresponding one of the plurality of CAM entries.

13. A cache as in statement 12, or any other appropriate statement herein, wherein the translation look-aside buffer comprises:
a plurality of gates for example: (30, 32, 36, 38 and 24), coupled to receive the plurality of match/non-match signals for example: (H0-HN), and coupled to the first decoder circuitry for example: (20) for receiving the decoded index, the plurality of gates providing a hit/miss signal for example: (output of 24).

14. A cache as in statement 8, or any other appropriate statement herein, wherein the translation look-aside buffer compares the tag portion for example: (14) of the address for example: (12) to all of the plurality of CAM entries for example: (40, 42, 44, 46, 48) concurrently and produces a corresponding match/non-match signal for example: (H0-HN) for each of the plurality of CAM entries.

15. A cache as in statement 14, or any other appropriate statement herein, wherein more than one of the plurality of match/non-match signals are asserted concurrently.

16. A cache as in statement 14, or any other appropriate statement herein, wherein a hit/miss signal for example: (output of 24) indicates a hit only when a first one of the plurality of CAM rows is selected and the corresponding match/non-match signal for said first one of the plurality of CAM rows indicates a match.

17. A cache as in statement 8, or any other appropriate statement herein, wherein said DM comprises a plurality of ways, and wherein a hit/miss signal for example: (output of 24) from the translation look-aside buffer selects for example: (28) one of the plurality of ways of the DM.

18. A cache as in statement 8, or any other appropriate statement herein, wherein the translation look-aside buffer comprises a plurality of ways, and wherein a first hit/miss signal for example: (output of 24) corresponds to a first way of the plurality of ways and a second hit/miss signal for example: (output of duplicate gate 24 for second way) corresponds to a second way of the plurality of ways.

19. A cache as in statement 8, or any other appropriate statement herein, wherein the translation look-aside buffer comprises a plurality of ways, and wherein a hit/miss signal for example: (output of 24) for only one way of the plurality of ways is ever asserted at a same time.

20. A cache for example: (10), comprising:
a translation look-aside buffer for example: (18, 30, 32, 36, 38, 24) which receives a tag portion for example: (14) of an address for example: (12),
wherein the translation look-aside buffer comprises a content addressable memory (CAM), wherein the CAM for example: (18) comprises a plurality of CAM rows for example: (40, 42, 44, 46, 48), wherein the plurality of CAM rows store a plurality of CAM entries, wherein each CAM row of the plurality of CAM rows stores a corresponding one of the plurality of CAM entries, and wherein the CAM has a plurality of ways;
a data memory (DM), wherein the DM for example: (25) comprises a plurality of DM rows, the plurality of DM rows storing a plurality of DM entries, wherein each DM row of the plurality of DM rows stores a corresponding one of the plurality of DM entries, and wherein the DM has the plurality of ways;
decoder circuitry for example: (20, 26, 62), which receives an index portion of the address, wherein the decoder circuitry decodes the index portion to produce a decoded index for example: (S0-SN),
wherein the decoder circuitry is coupled to both the CAM and the DM to provide the decoded index for example: (S0-SN), and
wherein the decoded index selects a first portion of the CAM for example: (a row as in FIGS. 2 and 3, or a column as in FIG. 4) and also selects a first portion of the DM for example: (DATA output from DM); and
select logic for example: (28), coupled to the DM for receiving the first portion of the DM that has been selected by the decoded index for example: (DATA), the select logic also receiving a hit/miss signal for example: (output of 24) to select a first way of the plurality of ways of the DM.

What is claimed is:

1. A method, comprising:
providing a content addressable memory (CAM) having a plurality of CAM rows, the plurality of CAM rows storing a plurality of CAM entries, wherein each CAM row of the plurality of CAM rows stores a corresponding one of the plurality of CAM entries;
providing a data memory (DM) having a plurality of DM rows, the plurality of DM rows storing a plurality of DM entries, wherein each DM row of the plurality of DM rows stores a corresponding one of the plurality of DM entries;
providing an address, the address comprising a tag portion and an index portion;
decoding the index portion of the address to produce a decoded index;
providing the decoded index to the CAM;
providing the decoded index to the DM;
in response to providing the decoded index to the CAM, selecting only one of the plurality of CAM rows as a selected CAM row;
in response to providing the decoded index to the DM, selecting only one of the plurality of DM rows as a selected DM row;
concurrently comparing the tag portion of the address to all of the plurality of CAM entries;
in response to said step of concurrently comparing the tag portion of the address to all of the plurality of CAM entries, producing a corresponding match/non-match signal for each of the plurality of CAM entries; and
asserting a hit/miss signal to indicate a hit only when a first one of the plurality of CAM rows is selected and the corresponding match/non-match signal for said first one of the plurality of CAM rows indicates a match.

2. A method as in claim 1, wherein the step of concurrently comparing the tag portion of the address to all of the plurality of CAM entries is completed before said step of decoding the index portion of the address is begun.

3. A method as in claim 1, wherein said CAM comprises a plurality of ways, and wherein the hit/miss signal corresponds to a first way of the plurality of ways and a second hit/miss signal corresponds to a second way of the plurality of ways.

4. A method as in claim 1, wherein said CAM comprises a plurality of ways, and wherein the hit/miss signal for only one way of the plurality of ways is ever asserted at a same time.

5. A method as in claim 1, wherein said DM comprises a plurality of ways, the method further comprising:
using the hit/miss signal to select one of the plurality of ways of the DM.

6. A method as in claim 1, wherein said CAM comprises a translation look-aside buffer.

7. A method as in claim 1, wherein the method is performed during a cache access for a read operation.

8. A cache, comprising:
one or more first conductors for transferring a tag portion of an address;
one or more second conductors for transferring an index portion of the address;
a translation look-aside buffer coupled to the one or more first conductors for receiving the tag portion,
wherein the translation look-aside buffer comprises a content addressable memory (CAM), wherein the CAM comprises a plurality of CAM rows, wherein the plurality of CAM rows store a plurality of CAM entries, wherein each CAM row of the plurality of CAM rows stores a corresponding one of the plurality of CAM entries;

a data memory (DM), wherein the DM comprises a plurality of DM rows, the plurality of DM rows storing a plurality of DM entries, wherein each DM row of the plurality of DM rows stores a corresponding one of the plurality of DM entries; and decode circuitry, coupled to the one or more second conductors for receiving the index portion, wherein said decode circuitry decodes the index portion to produce a decoded index, and wherein the decode circuitry is coupled to both the CAM and the DM to provide the decoded index.

9. A cache as in claim 8, wherein the decoded index is used to select both a first one of the plurality of CAM rows and a first one of the plurality of DM rows.

10. A cache as in claim 8, wherein the decode circuitry comprises:
a first read decoder coupled to the CAM; and
a second read decoder coupled to the DM,
wherein both the first read decoder and the second read decoder receives the index portion of the address and provide the decoded index during a read access to the cache.

11. A cache as in claim 10, wherein the decode circuitry further comprises:
a first write decoder coupled to the CAM;
wherein both the first write decoder receives the index portion of the address and provides the decoded index during a write access to the cache.

12. A cache as in claim 8, wherein the translation look-aside buffer comprises:
a plurality of match/non-match signals, wherein each one of the plurality of match/non-match signals corresponds to a corresponding one of the plurality of CAM rows, wherein each one of the plurality of match/non-match signals is asserted in response to the tag portion of the address matching the corresponding one of the plurality of CAM entries.

13. A cache as in claim 12, wherein the translation look-aside buffer comprises:
a plurality of gates, coupled to receive the plurality of match/non-match signals, and coupled to the first decoder circuitry for receiving the decoded index, the plurality of gates providing a hit/miss signal.

14. A cache as in claim 8, wherein the translation look-aside buffer compares the tag portion of the address to all of the plurality of CAM entries concurrently and produces a corresponding match/non-match signal for each of the plurality of CAM entries.

15. A cache as in claim 14, wherein more than one of the plurality of match/non-match signals are asserted concurrently.

16. A cache as in claim 14, wherein a hit/miss signal indicates a hit only when a first one of the plurality of CAM rows is selected and the corresponding match/non-match signal for said first one of the plurality of CAM rows indicates a match.

17. A cache as in claim 8, wherein said DM comprises a plurality of ways, and wherein a hit/miss signal from the translation look-aside buffer selects one of the plurality of ways of the DM.

18. A cache as in claim 8, wherein the translation look-aside buffer comprises a plurality of ways, and wherein a first hit/miss signal corresponds to a first way of the plurality of ways and a second hit/miss signal corresponds to a second way of the plurality of ways.

19. A cache as in claim 8, wherein the translation look-aside buffer comprises a plurality of ways, and wherein a hit/miss signal for only one way of the plurality of ways is ever asserted at a same time.

20. A cache, comprising:
a translation look-aside buffer which receives a tag portion of an address,
wherein the translation look-aside buffer comprises a content addressable memory (CAM), wherein the CAM comprises a plurality of CAM rows, wherein the plurality of CAM rows store a plurality of CAM entries, wherein each CAM row of the plurality of CAM rows stores a corresponding one of the plurality of CAM entries, and wherein the CAM has a plurality of ways;
a data memory (DM), wherein the DM comprises a plurality of DM rows, the plurality of DM rows storing a plurality of DM entries, wherein each DM row of the plurality of DM rows stores a corresponding one of the plurality of DM entries, and wherein the DM has the plurality of ways;
decoder circuitry, which receives an index portion of the address, wherein the decoder circuitry decodes the index portion to produce a decoded index,
wherein the decoder circuitry is coupled to both the CAM and the DM to provide the decoded index, and
wherein the decoded index selects a first portion of the CAM and also selects a first portion of the DM; and
select logic, coupled to the DM for receiving the first portion of the DM that has been selected by the decoded index, the select logic also receiving a hit/miss signal to select a first way of the plurality of ways of the DM.

* * * * *